No. 752,967. PATENTED FEB. 23, 1904.
J. A. FIELD.
BRAKE.
APPLICATION FILED APR. 2, 1903.
NO MODEL. 6 SHEETS—SHEET 1.

Witnesses.
L. M. Sangster.
Geo. A. Neubauer.

Inventor.
Jesse A. Field.
By
A. Sangster
Attorney.

No. 752,967. PATENTED FEB. 23, 1904.
J. A. FIELD.
BRAKE.
APPLICATION FILED APR. 2, 1903.
NO MODEL. 6 SHEETS—SHEET 2.

Fig. 3.

Witnesses.
L. M. Sangster.
Geo. A. Neubauer.

Inventor.
Jesse A. Field.
By A. J. Sangster
Attorney.

No. 752,967. PATENTED FEB. 23, 1904.
J. A. FIELD.
BRAKE.
APPLICATION FILED APR. 2, 1903.
NO MODEL. 6 SHEETS—SHEET 4.

Witnesses.
L. M. Sangster.
Geo. A. Neubauer.

Inventor.
Jesse A. Field
By C. J. Sangster
Attorney.

No. 752,967. PATENTED FEB. 23, 1904.
J. A. FIELD.
BRAKE.
APPLICATION FILED APR. 2, 1903.
NO MODEL. 6 SHEETS—SHEET 6.

Witnesses. Inventor.
Jesse A. Field.
By
Attorney.

No. 752,967.

Patented February 23, 1904.

UNITED STATES PATENT OFFICE.

JESSE A. FIELD, OF DUNKIRK, NEW YORK.

BRAKE.

SPECIFICATION forming part of Letters Patent No. 752,967, dated February 23, 1904.

Application filed April 2, 1903. Serial No. 150,804. (No model.)

*To all whom it may concern:*

Be it known that I, JESSE A. FIELD, a citizen of the United States, residing at Dunkirk, in the county of Chautauqua and State of New York, have invented a certain new and useful Improved Brake, of which the following is a specification.

This invention relates to an improved brake which is adapted to be applied by power derived from the rotation of an axle or the like; and the object of the invention is to provide a comparatively simple and efficient brake which shall be so arranged that when operatively connected with a rotatable means it will be forced by the rotation of the said rotatable means into frictional braking position therewith.

The invention also relates to certain details of construction, all of which will be fully and clearly hereinafter described and claimed, reference being had to the accompanying drawings, in which—

In referring to the drawings in detail, like numerals designate like parts.

1 represents the ordinary truck of a car in which axle-boxes 2 are mounted, the axles 3 being journaled in said boxes.

A multipart brake-shoe formed of a plurality of pivoted curved brake members is fitted nearly around each car-wheel 4, mounted on the axles 3. These brake-shoes are arranged so that they can be moved entirely out of contact at all points with the wheels 4 or brought into contact throughout their length with the periphery of said wheels. The advantages of this are that the wear caused by the frictional contact of the brake-shoe is distributed over the greater portion of the periphery of the wheel, thereby avoiding the flat wheels, and that the action of the brake is very quick and positive, owing to the extent of contact between the brake-shoe and wheel.

Figures 9, 10, 11, 12, 13, 14:
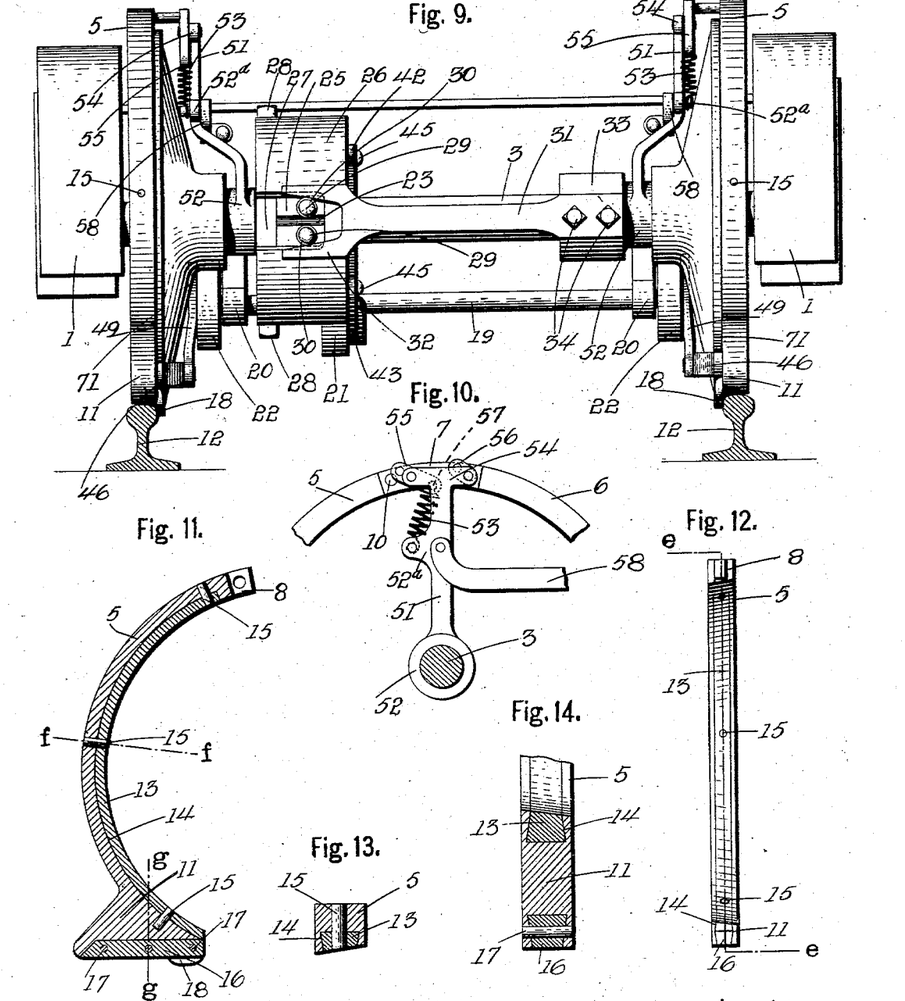
Fig. 9 is an end elevation of a truck equipped with the improved brake.
Fig. 10 represents a fragment of one of the multipart brake-shoes and its operating mechanism.
Fig. 11 is a longitudinal section on line *e e*, Fig. 12, through one of the curved brake members.
Fig. 12 is a detached interior view of one of the curved braking members.
Fig. 13 is a transverse section on line *f f*, Fig. 11.
Fig. 14 is a section on line *g g*, Fig. 11.

The brake-shoes are preferably composed of three members—two curved side members 5 and 6 and a short top member 7. The curved side members 5 and 6 are cut away or reduced in size at their upper ends, substantially as shown at 8 in Figs. 3, 11, and 12, and the top member 7 is provided with a longitudinal recess or depression 9 at each end, (see Fig. 3,) in which one of the reduced ends 8 fits and is pivoted by a pivot-pin 10. The lower extremities of the curved side members 5 and 6 are enlarged to constitute a friction-block 11, which is adapted to frictionally contact with the rail 12, upon which the wheels travel, when the brake is applied, and thereby assist in stopping the momentum of the car or train to which the brake is attached. To reduce the wear on the curved braking members 5 and 6, a hardened curved plate 13 may be attached to the interior of the members, substantially as shown in Fig. 11. This curved plate is preferably fitted in a dovetail socket 14, as shown in Fig. 13, and fastened therein by pins 15. The contacting portion of the rail-block 11 may likewise be provided with a separate hardened plate 16, fastened thereto by pins 17, to reduce the wear. An ear or projection 18 preferably extends downward from the inner edge of the block 11 and serves to prevent the block 11 moving laterally outward when in contact with the rail, and thereby holds the rail-blocks and the wheels from leaving the rails under certain circumstances—as, for instance, when the brake is applied hard the tendency would be to partially turn the brake and force the front rail-blocks strongly against the rails, perhaps even to lift the wheels themselves up from contact with the rails.

Figure 1:
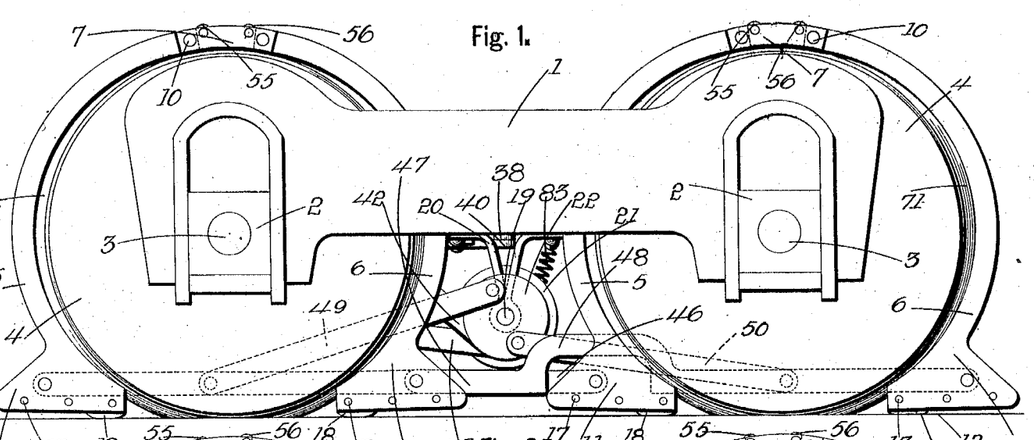
Figure 1 is a side elevation of a car-truck equipped with the improved brake with the brake in released position.
Figure 2:
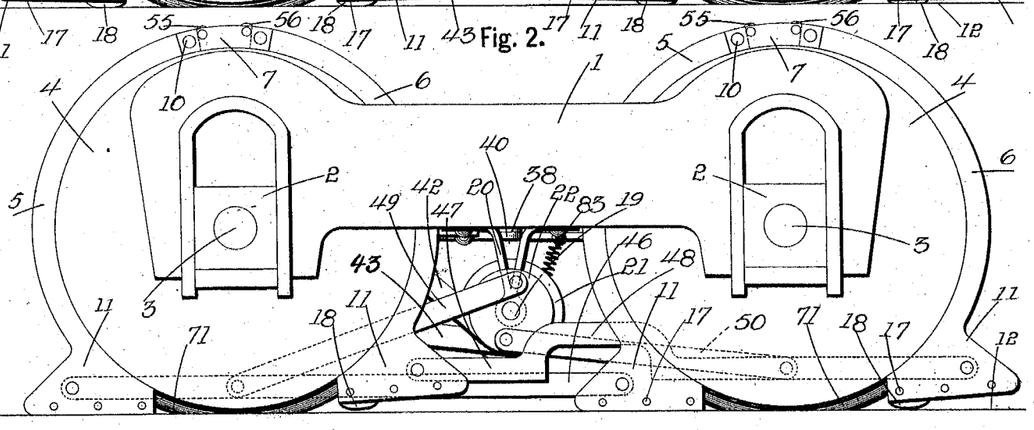
Fig. 2 is a side elevation of a car-truck equipped with the improved brake with the brake in its set position.
Figure 3:
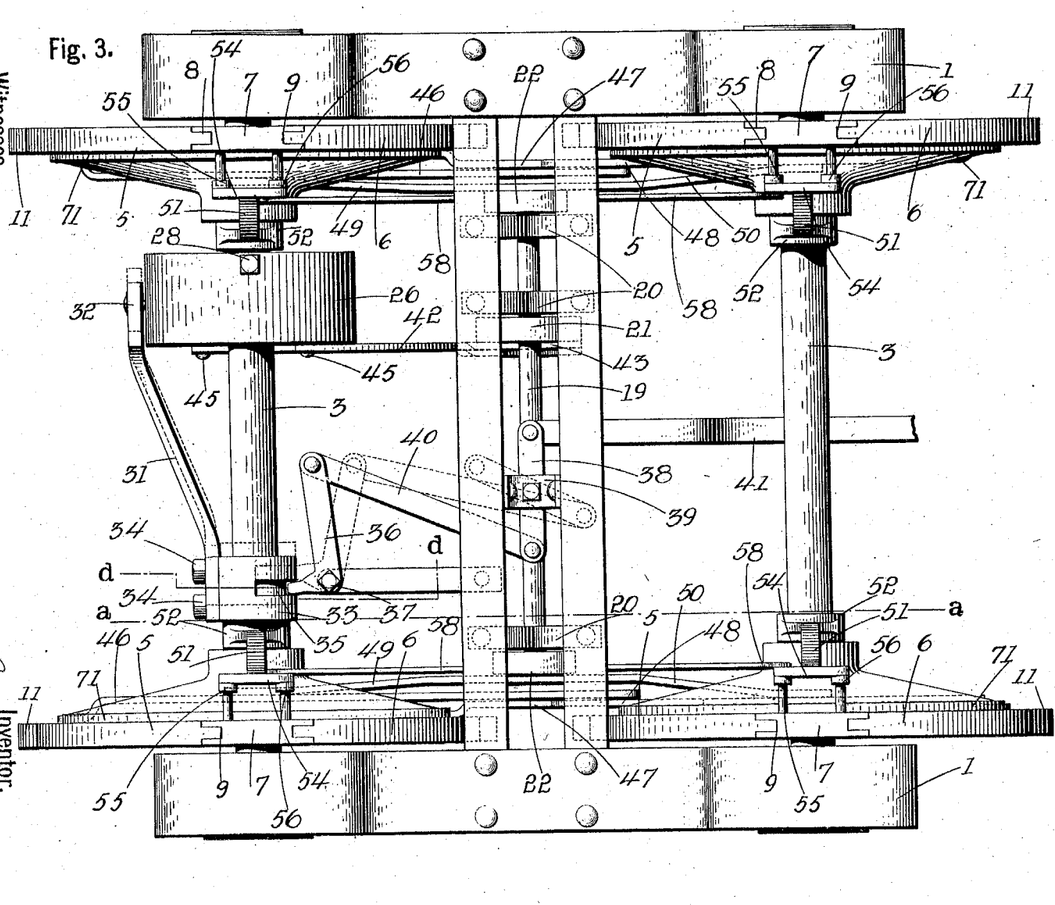
Fig. 3 is a top plan view of a truck equipped with the improved brake, the brake being in released position, the means for operating the friction-band being shown in two positions in dotted and full lines.
Figure 4:
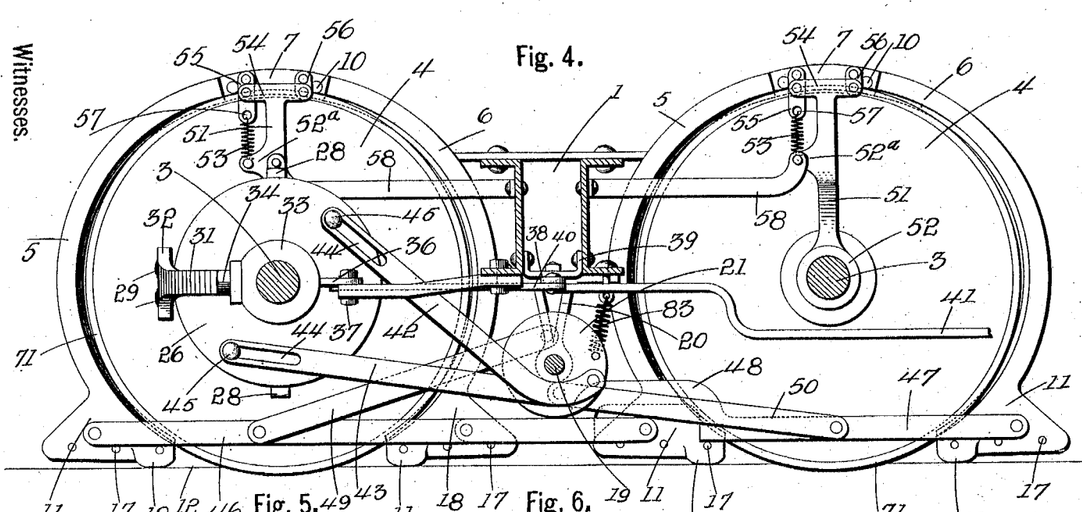
Fig. 4 is a vertical longitudinal section on line *a a*, Fig. 3.
Figure 5:
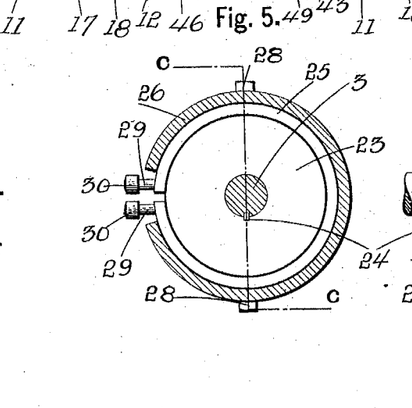
Fig. 5 is a section through the friction-band and its coöperating and supporting parts on line *b b*, Fig. 6.
Figures 6, 7, 8:
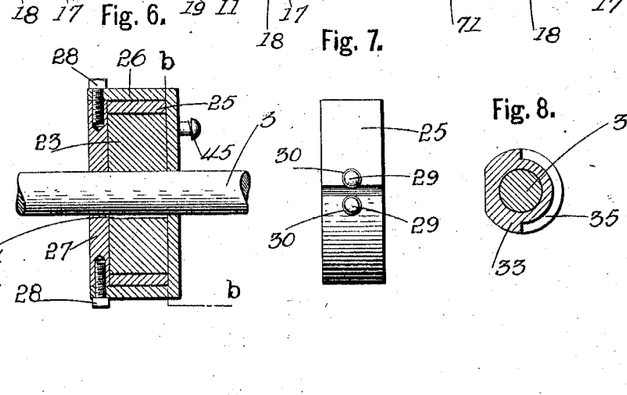
Fig. 6 is a section on line *c c*, Fig. 5.
Fig. 7 is a detached end view of the friction-band.
Fig. 8 is a transverse section through one of the axles and the sliding collar on line *d d*, Fig. 3.

The mechanism for throwing the brake into operative connection with the axle, whereby it will be automatically applied by the rotation thereof, preferably consists of a rock-shaft 19, journaled in brackets 20, attached to the truck, a disk 21 on said rock-shaft having operative connection to a friction device on one of the axles and disks 22 on said rock-shaft having operative connection to the multipart brake-shoes. The friction device on the axle is formed, preferably, as shown in Figs. 5, 6, and 7 and comprises a disk 23, fastened to the axle by a feather 24, a split spring ring or band 25 around said disk, and a case 26, inclosing said spring-band. The open end of the case is closed by an end plate 27, which is secured in place by screw-bolts 28. Two pins 29 project substantially horizontally out from the ends of the split band 25, on which rollers 30 are mounted. The split spring-band 25 is brought into frictional contact with the disk 23 by an angular bar 31, which has a bifurcated end 32, adapted to straddle the pins 29, and the inner walls of the forks of said end are tapered or converge toward each other inwardly from their extremities, substantially as shown in Fig. 9. The opposite end of the angular bar is bolted to a slide-collar 33 by bolts 34. The slide-collar 33 is slotted, as shown at 35 in Fig. 3, and the shorter end of a bell-crank 36 projects into said slot, so that the collar is slid on the axle by rocking the bell-crank on its pivot 37. This rocking movement is accomplished by a system of connecting-rods and levers, substantially as shown in Fig. 3. A lever 38 is pivoted to a bracket 39, extending from the truck, and is connected at its respective ends to a connecting-rod 40, which in turn connects to a longer end of the bell-crank 36 and a connecting-rod 41, which extends into connection with any convenient operating lever or handle. The disk 21 is connected to the inclosing case by two connecting-rods 42 and 43, each of which is connected at its inner end to the disk 21 and is provided with a longitudinal slot 44 near its outer end, in which a pin 45, attached to the inclosing case 28, slidably engages. The pins 45 are located approximately diametrically opposite each other, so that the brake will be applied with the axle revolving in either direction, the rod 42 rocking the rock-shaft 19 when the axle is rotating in one direction and the rod 43 rocking the shaft 19 when the axle is rotating in the opposite direction. The purpose of the slot 44 is to permit the rods 42 and 43 to move independently of the movement of the disk, so that the movement of the disk will move one rod only without affecting the other. The disk 22 is connected to the curved side brake members 5 and 6 by connecting-rods, so that the rocking of the shaft 19 will move said members into or out of braking engagement with the wheel. The brakes are preferably arranged in pairs, the side members 5 of said pair being connected together by a rod 46 and the side members 6 by a rod 47. These rods are pivoted to the blocks 11 at the lower ends of the side members, so that the greater possible amount of leverage may be obtained, and the rod 47 is bent in one part to avoid the pivot at one end of the rod 46, substantially as shown at 48 in Fig. 4.

Two rods 49 and 50 are employed to operate the rods 46 and 47, the inner ends of which are pivoted at approximately diametrically opposite points on the disk 22 and the outer ends of which are pivoted to intermediate points of the rods 46 and 47.

The top member 7 of the brake-shoe is supported normally out of contact with the wheel by an upright support 51, which has a hub 52 loose on the axle. This support is substantially T-shaped and has an enlargement or lug 52ª projecting from one side, to which the lower end of a spiral spring 53 is secured.

The top member 7 is supported from the horizontal top 54 of the support 51 by links 55 and 56, which are pivoted at their respective ends to the ends of the horizontal top 54 and the top member 7. The link 55 is longer than the link 56 and projects below the top 54, the projecting end being provided with an eye 57, in which the upper extremity of the spring 53 is secured.

Figure 15:
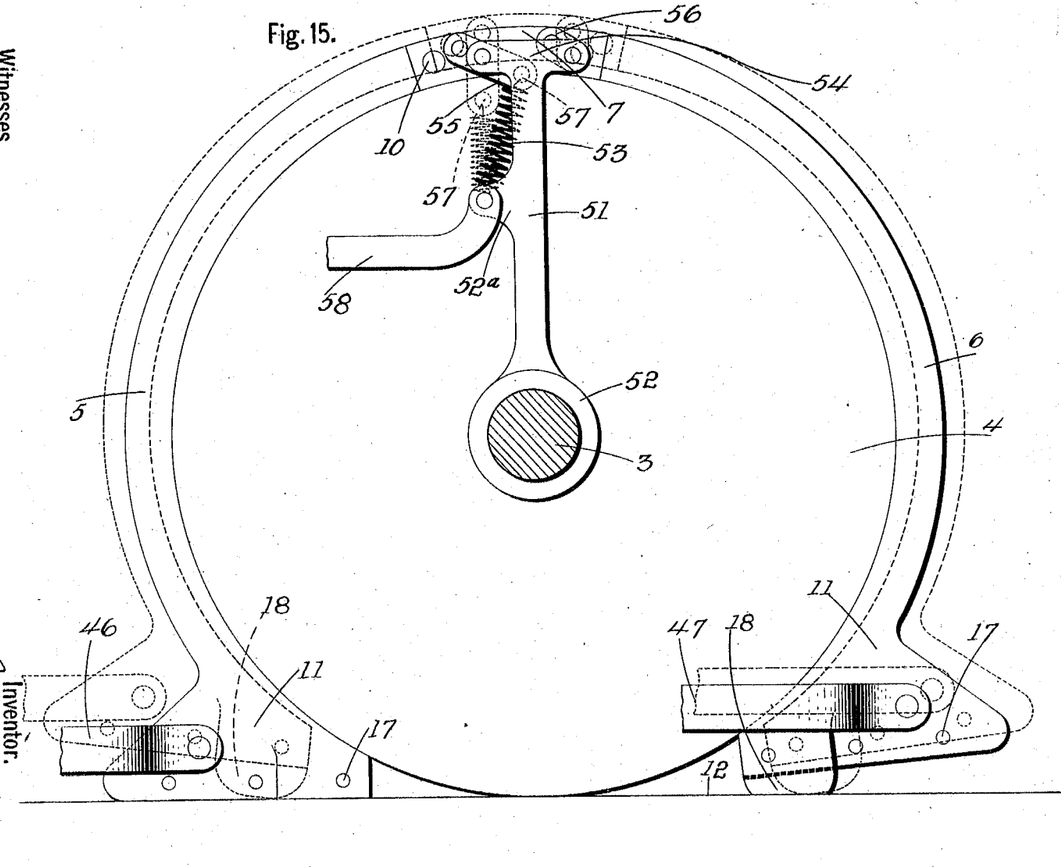
Fig. 15 is an enlarged view illustrating the action of one of the multipart brake-shoes.

The purpose of the spring 53 is to hold the link 55 in a substantially vertical position with a spring tension, and thereby normally maintain the top portion of the brake-shoe out of frictional contact with the wheel. When the curved side members are brought into contact with the wheel, the rotation of the wheel partially turns or carries the brake with it, and thereby moves the top member to one side, so that the links 55 and 56 turn on their pivots from the upright position shown in Fig. 15 to the inclined position shown in said figure and draw the top member into contact with the wheel.

The support 51 is held in vertical position by a cross-brace 58, extending from the truck.

Figures 16, 17, 18:
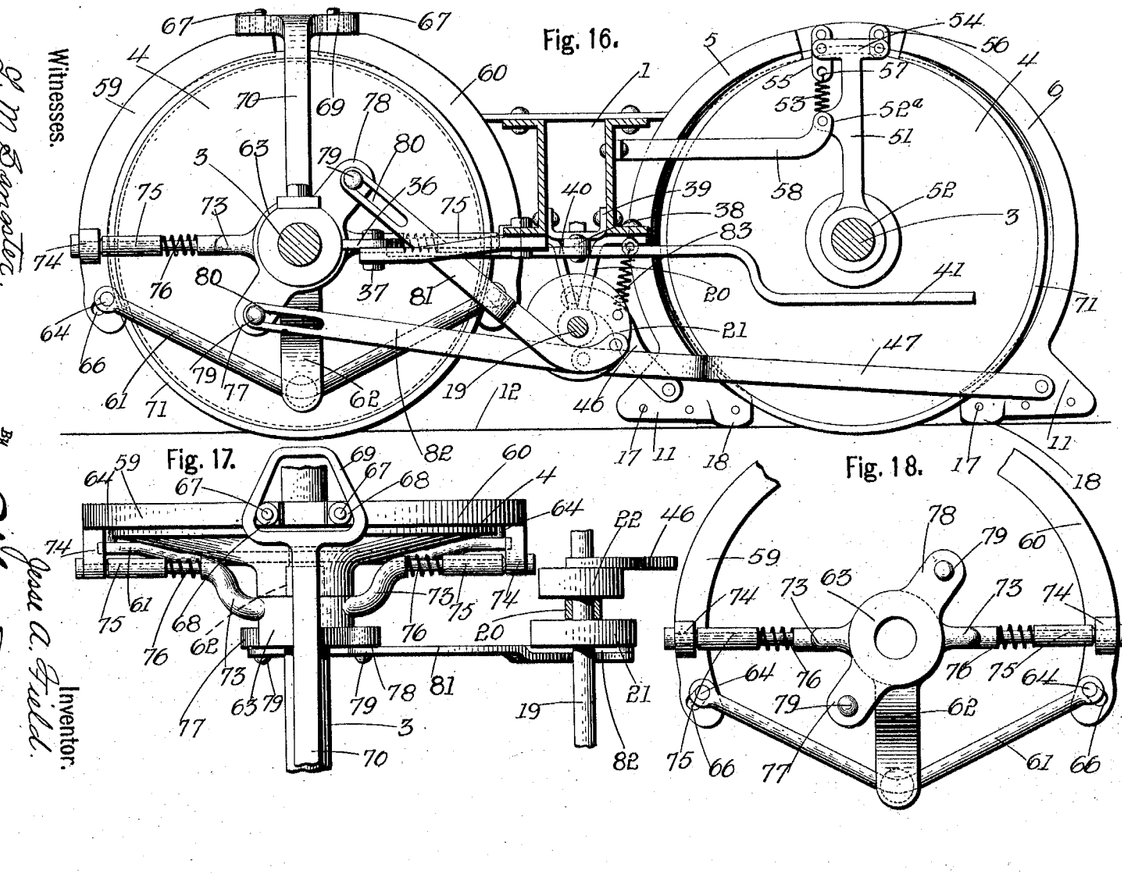
Fig. 16 is a sectional view, similar to Fig. 4, of a modified form.
Fig. 17 is a fragmentary plan of one wheel and the modified form of brake therefor.
Fig. 18 is a fragmentary view showing the modified form of friction-band.

In the modified form shown in Figs. 16, 17, and 18 another construction of friction-band mechanism is employed in lieu of the friction-band on the axle, which acts directly on one of the wheels, thereby dispensing with the disk 23. In this modified construction two curved friction-arms 59 and 60 are arranged partially around the periphery of one of the wheels and are connected to each other near their lower and outer ends by an angular or bent connecting-rod 61, which is supported at approximately its center by a downwardly-extending brace-rod 62, which has a collar or hub 63 at its upper end loose on the axle. The outer ends of the rod 61 are provided with laterally-extending pins 64, which project through diagonal extending slots 66 in the lower ends of the friction-arms 59 and 60. The pins 64 are secured rigidly to the rod, preferably by fitting one end firmly in eyes 65. The upper ends of the curved arms 59 and 60 are appreciably separated from each other and provided with vertically-projecting pins 67, on which rollers 68 are supported. These pins are drawn toward each other by means of a loop device 69 at the end of an angular bar 70, which is similar to the angular bar 31 of the preferred construction and is operated by a slide-collar in the same manner as the bar 31, with the exception that the bar 70 is drawn in to move the arms into frictional contact with the wheel instead of being thrust out, as the bar 31 is. The reason for this is that the inner flange 71 of the wheel acts as a stop and prevents the loop drawing the curved arms laterally inward from the periphery of the wheel as the curved arms are brought into contact with the wheel. The sides of the loop device taper, so that its inward movement will move the pins 67 toward each other. The hub 63, loosely mounted on the axle, has two arms 72 and 73 extending oppositely therefrom, and each of said arms has its outer end slidably fitting through an opening in an ear 74, projecting laterally from one of the arms 59 and 60, and serves to maintain the curved arms 59 and 60 properly in position relative to the wheel against which they operate. The arms 59 and 60 are normally held from contact with the wheel by sleeves 75, slidably fitted on the arms 72 and 73 and having their outer ends yieldingly pressed against the ears 74 by spiral springs 76 fitted loosely around the arms 72 and 73. Arms 77 and 78 project diagonally from the hub 63 and diametrically opposite to each other, each of which has a lateral pin 79, which slidably projects through longitudinal slots 80 in connecting-rods 81 and 82, which are similar to the connecting-rods 42 and 43 of the preferred construction, and connect in precisely the same manner to the disk 21 on the rock-shaft 19. The remainder of the modified form is similar to the preferred construction.

One of the great advantages is that the connecting-rod 41 is pivoted to the lever 38, so as to be exactly in the center of the truck when in its normal position. The object of this is to provide for the proper operation of the brake no matter in what position the truck may be turned.

The operation is as follows: The motorman or other operator moves a handle, which motion is transmitted to the rock-shaft 19 by means of a friction device mounted on one of the axles, and normally loose thereon, which is frictionally locked to said axle through the system of connecting-rods described, which turns the bell-crank 36 on its pivot and shifts the slide-collar, thereby moving the friction device into locking position. The slide-collar in the preferred construction moves the angular bar 31 and by means of the bifurcated end 32 draws the split spring-band 25 into frictional contact with the disk 23. The band 25 now turns with the disk 23, and the projecting pins 29 catch against the edge of the opening through which they pass in the inclosing case 26 and likewise turn the case. The motion of this case is transmitted to the rock-shaft 19 by the operating-rod of the connecting-rods 42 and 43, which turns the disk 21 and rocks the shaft 19. The rocking of the shaft 19 moves the connecting-rods 49 and 50, which shifts the rods 46 and 47 and brings the curved braking members in contact with the wheel and applies the brake. The rock-shaft is restored to its initial inoperative position and maintained in said position by a spring 83, which is connected at its respective ends to the truck and the disk 22.

The operation of the modified form is similar to the above with the exception that the curved arms 59 and 60 are moved into frictional contact with one of the wheels by a loop device 69 at the end of an angular bar 70 and slightly turns a hub 63, that has arms 77 and 78, which are connected by rods 81 and 82 to the disk 31 on the rock-shaft 19.

I claim as my invention—

1. In combination, a rotatable axle having a wheel, a brake-shoe adapted to frictionally engage said wheel, a rotatable rock-shaft having means for applying the brake, and a friction device on the axle having means for rocking the shaft.

2. In combination, a rotatable axle having a wheel, a multipart brake-shoe adapted to frictionally engage said wheel, a rotatable rock-shaft having means for applying the brake, and a friction device on the axle having means for rocking the shaft.

3. In combination, a rotatable axle having a wheel, a multipart brake-shoe formed of a plurality of pivoted curved members and a pivotally-connecting member, said members being adapted to fit nearly around said wheel and all of said members being arranged to frictionally contact with the wheel.

4. In combination, a rotatable axle having a wheel, a multipart brake-shoe formed of a plurality of curved members adapted to fit nearly around said wheel, a connecting member pivoted to the curved members and means for applying the brake, said connecting member being adapted to frictionally contact with the wheel, substantially as set forth.

5. In combination, a rotatable axle having a wheel and a brake-shoe adapted to fit nearly around the wheel and comprising two curved side members and a top member pivoted to said side members, all of said members being adapted to frictionally contact with the braking-surface of the wheel, substantially as set forth.

6. In combination, a rotatable axle having a wheel and a brake-shoe adapted to fit nearly around the wheel and comprising two curved side members reduced in size at their upper ends and a top member provided with a longitudinal recess at each end in which the reduced ends of the side members fit and are pivoted, all of said members being adapted to contact with the wheel, substantially as set forth.

7. In combination, a rotatable axle having a wheel and a brake-shoe fitting nearly around the wheel and having a plurality of pivotal side members and a connecting top member and friction-blocks at the lower ends of some of said members adapted to contact with the rail.

8. In combination, a rotatable axle having a wheel and a brake-shoe fitting partially around the wheel and having a plurality of pivotal members and a connecting member; said connecting member being adapted to be brought into contact with the wheel by a slight movement of the pivotal members in correspondence with the rotation of the wheel.

9. In combination, a rotatable axle having a wheel and a brake-shoe adapted to fit nearly around the wheel and having at least three members all of which are adapted to frictionally contact with the braking-surface of the wheel.

10. In combination, a rail, a rotatable axle having a wheel on the rail, and a brake-shoe having a friction-block adapted to contact with the rail when the brake is applied and an ear or projection extending from the inner surface of said block and adapted to project on the inner side of the rail.

11. In combination, a rail, a rotatable axle having a wheel on the rail, and a brake-shoe fitting partially around the wheel and having a friction-block adapted to contact with the rail when the brake is applied and an ear or projection extending down from the inner side of said block and adapted to project on the inner surface of the rail to prevent the block moving laterally from the rail.

12. In combination, an axle having a wheel, a multipart brake-shoe adapted to fit nearly around the wheel and means whereby all of the parts of said brake-shoe may move into and out of contact with said wheel.

13. In combination, a rotatable axle having a wheel, a rotatable rock-shaft, a friction device on said axle having operative connection to said rock-shaft, and a brake-shoe having operative connection to said rock-shaft.

14. In combination, a rotatable axle having a wheel, a rotatable rock-shaft, a plurality of disks on said rock-shaft, a friction device on said axle having operative connection to one of the disks on said rock-shaft, and a brake-shoe having operative connection to another of the disks on said rock-shaft.

15. In combination, a rotatable axle having a wheel, a rotatable rock-shaft, a friction device on the axle, rods operatively connecting the friction device to the rock-shaft and a brake-shoe adapted to be applied by the rocking of the shaft.

16. In combination, an axle having a wheel, a brake-shoe adapted to fit nearly around the wheel comprising side members and a top member pivoted together, means for moving the side members into and out of frictional contact with the wheel and means for normally supporting the top member from contact with the wheel; said top member being adapted to be brought into contact with the wheel by the turning of the side members when in contact therewith, substantially as set forth.

17. In combination, an axle having a wheel, a brake-shoe adapted to fit nearly around the wheel comprising side members and a top member pivoted together, means for moving the side members into and out of frictional contact with the wheel, a support, links pivoted to said support and the top member for normally supporting said top member from contact with the wheel; said top member being adapted to be brought into contact with the wheel by the turning of the side members when in contact therewith, substantially as set forth.

18. In combination, an axle having a wheel, a brake-shoe adapted to fit nearly around the wheel and having yieldingly-connected parts, means for moving at least one of said parts into and out of contact with the wheel, and at least another part being adapted to be brought into contact with said wheel by a slight turning of the brake-shoe consequent upon the contact of the first-mentioned part with said wheel.

19. In combination, a truck, a plurality of axles in said truck having wheels, a plurality of brake-shoes, a rock-shaft, means wholly actuated by the rotation of an axle adapted to rock said shaft and mechanism operatively connecting said rock-shaft to all of said brake-shoes.

20. In combination, an axle having a wheel, a brake-shoe adapted to fit nearly around the wheel comprising side members and a top member pivoted together, means for moving the side members into and out of frictional contact with the wheel, a support, links pivotally connected to said support and the top member and a spring for normally holding said links extended and the top member out of contact with the wheel, substantially as set forth.

21. In combination, an axle having a wheel, a brake-shoe adapted to fit nearly around the wheel comprising side members and a top member pivoted together, means for moving the side members into and out of frictional contact with the wheel a vertical support having a T-shaped upper portion and a hub loose on the axle, links pivoted to the T of the support and the top member, one of said links being longer than the other, and a spring connected to the longer link, substantially as set forth.

22. In combination, a truck, a plurality of axles in said truck having wheels, a plurality of brake-shoes, a rotatable rock-shaft, a friction mechanism actuated by the rotation of an axle adapted to rock said shaft and mechanism operatively connecting said rock-shaft to all of said brake-shoes.

23. In combination, a truck, a plurality of axles in said truck having wheels, a plurality of brake-shoes, a rock-shaft, means wholly actuated by the rotation of an axle adapted to rock said shaft, and rods operatively connecting said rock-shaft to all of said brake-shoes.

24. In combination, a truck, a plurality of axles in said truck having wheels, a plurality of brake-shoes and a rotatable brake-applying mechanism directly connecting to said brake-shoes and adapted to be operated by the rotation of an axle, substantially as set forth.

25. In combination, a rotatable axle having a wheel and a disk, a rock-shaft, a friction device on the axle having a split spring-band around the disk on the axle and a case inclosing said band, rods operatively connecting said case to the rock-shaft and a brake-shoe adapted to be applied by the rocking of said shaft.

26. In combination, a rotatable axle having a wheel and a disk, a rock-shaft, a friction device on the axle having a split spring-band around the disk on the axle and a case inclosing said band, pins projecting from the ends of the split band and carrying rollers, an angular bar having a bifurcated end with tapered forks straddling the pins, a slide-collar on the axle to which the angular bar is attached, means for sliding the collar, rods operatively connecting the inclosing case to the rock-shaft, and a brake-shoe adapted to be applied by the rocking of said shaft.

27. In combination, a rotatable axle, a rock-shaft, a brake adapted to be applied by the rocking of said shaft, a friction device on the axle, and two rods operatively connecting the friction device to the rock-shaft.

28. In combination, a rotatable axle, a rock-shaft, a brake adapted to be applied by the rocking of said shaft, a friction device on the axle, and two rods operatively connecting the friction device to the rock-shaft, said rods being slotted and having connection to said friction device at diametrically opposite points.

29. In combination, a rotatable axle, a rock-shaft, a brake adapted to be applied by the rocking of said shaft, a friction device on the axle, means for operatively connecting the friction device to the rock-shaft, a bar having tapered parts for operating the friction device and a collar on the axle and means for sliding said collar.

30. In combination, a rotatable axle, a rock-shaft, a brake adapted to be applied by the rocking of said shaft, a friction device on the axle, a plurality of rods having operative connection to the rock-shaft, said rods having longitudinal slots near their ends, and pins extending from the friction device and projecting in said slots.

31. In combination, a rotatable axle, a rock-shaft, a brake adapted to be applied by the rocking of said shaft, a friction device on the axle, a plurality of rods having operative connection to the rock-shaft, said rods having longitudinal slots near their ends, and pins extending from the friction device diametrically opposite each other and projecting in said slots.

32. In combination, a rotatable axle having a wheel, a friction device on said axle, a bar for operatively connecting said friction device to the axle, a slide-collar on said axle attached to said bar, a bell-crank having operating connection to said slide-collar, a system of connecting rods and levers adapted to rock said bell-crank, a brake-shoe, and means controlled by the friction device for applying the brake, substantially as set forth.

33. In combination, a rotatable axle having a wheel, a friction device on said axle, a bar for operatively connecting said friction device to the axle, a slide-collar on said axle attached to said bar and having a slot, a bell-crank, an end projecting into said slot in said slide-collar, a system of connecting rods and levers adapted to rock said bell-crank, a brake-shoe, and means controlled by the friction device for applying the brake, substantially as set forth.

34. In combination, a rotatable axle having a wheel, a rock-shaft, frictional mechanism on said axle adapted to rock said shaft, a brake-shoe having a plurality of members partially inclosing the wheel and means operatively connecting a majority of said members to the rock-shaft.

35. In combination, a rotatable axle having a wheel, a rock-shaft, frictional mechanism on said axle adapted to rock said shaft, a brake-shoe having a plurality of members partially encircling the wheel and rods operatively connecting a majority of said members to the rock-shaft.

36. In combination, a rotatable axle having a wheel, a rock-shaft, a disk on said rock-shaft, frictional mechanism on said axle adapted to rock said shaft, a brake-shoe having a plurality of members partially encircling the wheel and means operatively connecting a majority of said members to the disk, substantially as set forth.

37. In combination, a truck, axles in said truck having wheels, a brake-shoe partially encircling each wheel and having pivoted side members, a rod connecting each side member of each shoe to a corresponding side member of an adjacent shoe, and means for moving said rods to apply the brake, substantially as set forth.

38. In combination, a truck, axles in said truck having wheels, a brake-shoe partially inclosing each wheel and having pivoted side members, a rod connecting each side member of each shoe to a corresponding side member of an adjacent shoe, a rock-shaft, rods connecting the said first-mentioned connecting-rods to the rock-shaft and means for rocking said shaft.

39. In combination, a truck, axles in said truck having wheels, a brake-shoe partially inclosing each wheel and having pivoted side members, a rod connecting each side member of each shoe to a corresponding side member of an adjacent shoe, a rock-shaft, rods connecting the said first-mentioned connecting-rods to the rock-shaft and friction means on one of said axles having operating connection to the rock-shaft.

40. In combination, a truck, axles in said truck having wheels, a brake-shoe partially inclosing each wheel and having pivoted side members, a rod connecting each side member of each shoe to a corresponding side member of an adjacent shoe, a rock-shaft, rods connecting the said first-mentioned connecting-rods to the rock-shaft and friction means on one of said axles having operating connection to the rock-shaft and adapted to be operatively connected to the axle, substantially as set forth.

41. In combination, a truck, axles in said truck having wheels, a plurality of brake-shoes having pivoted side members a rod connecting each side member of each shoe to a corresponding side member of an adjacent shoe and means for moving said rods to apply the brake, substantially as set forth.

42. In combination, a truck, axles in said truck having wheels, a plurality of brake-shoes having pivoted side members each of which is connected to a corresponding side member of an adjacent shoe, and means for moving said side members to apply the brake, substantially as set forth.

43. In combination, a truck, a plurality of axles in said truck having wheels, a plurality of brake-shoes and a rotatable brake-applying mechanism directly connecting to said brake-shoes and comprising in part a friction device on an axle, substantially as set forth.

44. In combination, a truck, a plurality of axles in said truck having wheels, a plurality of brake-shoes and a brake-applying mechanism operatively connecting to said brake-shoes and comprising in part a friction device on an axle, a rotatable rock-shaft and a series of connecting-rods, substantially as set forth.

45. In combination, a car-truck, a brake device and mechanism for operating said brake device including a connecting-rod having its normal pivoting-point exactly in the center of the truck whereby the brake may be properly operated at any position to which the truck may be turned on a track curve.

46. In combination, a car-truck, a brake device and mechanism for operating said brake device including a lever having pivotal support from the truck, devices connecting to said lever, and a connecting-rod pivoted to said lever at the center of the truck whereby the brake may be properly operated at any position to which the truck may be turned on a track curve.

JESSE A. FIELD.

Witnesses:
N. F. GOULD,
W. C. MARSH.